(12) United States Patent
Diouf et al.

(10) Patent No.: US 7,697,547 B2
(45) Date of Patent: Apr. 13, 2010

(54) INTERNET PROTOCOL VIDEO DELIVERY IN PASSIVE OPTICAL NETWORKS

(75) Inventors: Leopold Diouf, Raleigh, NC (US); Tom Van Caenegem, Schelderode (BE)

(73) Assignee: Alcatel Lucent, Paris (FR)

( * ) Notice: Subject to any disclaimer, the term of this patent is extended or adjusted under 35 U.S.C. 154(b) by 1161 days.

(21) Appl. No.: 11/295,824

(22) Filed: Dec. 7, 2005

(65) Prior Publication Data

US 2006/0120723 A1    Jun. 8, 2006

Related U.S. Application Data

(60) Provisional application No. 60/634,310, filed on Dec. 8, 2004.

(51) Int. Cl.
*H04L 12/28* (2006.01)

(52) U.S. Cl. .................. 370/399; 370/236.2; 370/241.1; 370/389; 370/392; 370/398; 370/437; 370/485; 370/486; 725/120; 725/114; 725/115; 725/116; 725/117; 398/45

(58) Field of Classification Search .................. 370/389, 370/392, 398, 399, 437, 485, 486, 236.2, 370/241.1; 725/120, 114–117; 398/25–38, 398/66, 67, 70, 71, 45
See application file for complete search history.

(56) References Cited

U.S. PATENT DOCUMENTS

| | | | |
|---|---|---|---|
| 6,728,248 B1 * | 4/2004 | Uchida et al. ............ 370/395.1 |
| 6,801,497 B1 * | 10/2004 | Van Driessche ............. 370/225 |
| 7,139,487 B2 * | 11/2006 | Kozaki et al. ............... 398/100 |
| 2002/0146026 A1 * | 10/2002 | Unitt et al. .................. 370/428 |
| 2003/0053176 A1 * | 3/2003 | Nishigaki et al. ........... 359/168 |
| 2005/0013314 A1 * | 1/2005 | Lim et al. ................... 370/432 |
| 2005/0172329 A1 * | 8/2005 | Kim et al. ................... 725/129 |
| 2008/0144622 A1 * | 6/2008 | Platnic ........................ 370/390 |
| 2008/0285972 A1 * | 11/2008 | Takeuchi et al. ............. 398/60 |

OTHER PUBLICATIONS

Van Der Plas, et al.; Demonstration of an ATM-Based Passive Optical Network in the FTTH Trial on Bermuda; IEEE Global Telecommunications Conference, 1995. GLOBECOM '95.; Nov. 13-17, 1995; pp. 988-992; vol. 2.

Van Der Plas, et al.; ATM Over Passive Optical Networks: System Design and Demonstration; SPIE; Fiber Networks for Voice, Video and Multimedia Services Proceedings; Nov. 19, 1992; pp. 48-57; vol. 1786.

Gobl, et al.; ARIDEM—A Multi-Service Broadband Access Demonstrator; Ericsson Review; 1996; pp. 92-97; vol. 73, No. 3.

* cited by examiner

*Primary Examiner*—Aung S Moe
*Assistant Examiner*—Christopher P Grey
(74) *Attorney, Agent, or Firm*—John E. Curtin

(57) ABSTRACT

Data representing video content is distributed over a passive optical network (PON) on virtual channels that are assigned to television (TV) channels as subscribers request the TV channels and de-assigned from TV channels when subscribers are no longer viewing them. Associating and de-associating TV channels with virtual channels can be performed with very low latency by using a near-physical layer protocol, such as the Physical Layer Operation Administration and Maintenance (PLOAM) protocol.

9 Claims, 6 Drawing Sheets

| Configure Multicast Port-ID message | | |
|---|---|---|
| OCTET | CONTENT | DESCRIPTION |
| 1 | ONU-ID | DIRECTED MSG TO ONE ONT |
| 2 | NEXT FREE ID | MESSAGE ID "CONFIGURE MULTICAST PORT" |
| 3 | 0000000a | BYTES 4-5 DEFINE DOWNSTREAM AND UPSTREAM PORT-ID<br>a: 1 ACTIVATES THIS MULTICAST PORT-ID<br>a: 0 DE-ACTIVATES THIS MULTICAST PORT-ID |
| 4 | abcdefgh | abcdefgh = PORT-ID[11..4] |
| 5 | ijkl0000 | ijklmnop = PORT-ID[3..0] |
| 6 | | |
| 7-12 | | |
| 13 | CRC | CYCLIC REDUNDANCY CHECK BITS |

FIG. 3

| Configure Multicast VP message | | |
|---|---|---|
| OCTET | CONTENT | DESCRIPTION |
| 1 | ONU-ID | DIRECTED MSG TO ONE ONT |
| 2 | NEXT FREE ID | MESSAGE ID "CONFIGURE MULTICAST VP" |
| 3 | 0000000a | BYTES 4-5 DEFINE DOWNSTREAM AND UPSTREAM VP<br>a: 1 ACTIVATES THIS MULTICAST VP<br>a: 0 DE-ACTIVATES THIS MULTICAST VP |
| 4 | abcdefgh | abcdefgh = VP[11..4] |
| 5 | ijkl0000 | ijklmnop = VP[3..0] |
| 6 | | |
| 7-12 | | |
| 13 | CRC | CYCLIC REDUNDANCY CHECK BITS |

FIG. 4

| ADDRESS OF TV CHANNEL REQUESTED BY USER | ONT PORT FROM WHICH TV CHANNEL REQUEST IS RECEIVED |
|---|---|
| ADDRESS 1 | PORT 1 |
| ADDRESS 2 | PORT 2 |
| ADDRESS 3 | PORT 3 |
| ⋮ | ⋮ |
| ADDRESS N | PORT N |

FIG. 5

| ADDRESS OF TV CHANNEL REQUESTED BY USER | VIRTUAL CHANNEL ASSOCIATED WITH REQUESTED TV CHANNEL |
|---|---|
| ADDRESS 1 | VIRTUAL CHANNEL 1 |
| ADDRESS 2 | VIRTUAL CHANNEL 2 |
| ADDRESS 3 | VIRTUAL CHANNEL 3 |
| ⋮ | ⋮ |
| ADDRESS N | VIRTUAL CHANNEL N |

FIG. 6

INTERNET PROTOCOL VIDEO DELIVERY IN PASSIVE OPTICAL NETWORKS

CROSS-REFERENCE TO RELATED APPLICATION

The benefit of the filing date of U.S. provisional patent application Ser. No. 60/634,310, filed Dec. 8, 2004, entitled "IP VIDEO DELIVERY IN PON NETWORKS," is hereby claimed, and the specification thereof is incorporated herein by this reference.

BACKGROUND OF THE INVENTION

1. Field of the Invention

The present invention relates generally to delivery of Internet Protocol (IP) video content via a network from a source, such as a broadcaster, to users, such as subscribers to a broadcast service and, more specifically, to delivery of IP video content via a passive optical network (PON).

2. Description of the Related Art

Most digital telecommunications networks (i.e., networks that facilitate the communication of data, voice, video, etc., between parties or between a content distribution service and subscribers) typically comprise active components, such as repeaters, relays and other such devices that consume power, in the path between an exchange and a subscriber. In addition to requiring power, active components are subject to failure and performance degradation over time, and may require significant periodic maintenance. The passive optical network (PON) has been developed to overcome some of the deficiencies. The essence of a PON is that, but for the (active) electronic equipment at the exchange or central office end of the PON and subscriber end of the PON, the PON comprises nothing but optical fiber and passive components. A single fiber can run from the central office to a passive splitter located near a group of subscribers, such as a neighborhood or office complex, and individual fibers can run from the splitter to individual subscribers.

The International Telecommunications Union (ITU) and the Institute of Electrical and Electronics Engineers (IEEE) are two standards-making bodies currently developing PON standards. The ITU has adopted the recommendations of the Full Service Access Networks (FSAN) organization, including G983.x, a specification for Broadband PON (BPON), also referred to as "APON," a reference to the Asynchronous Transfer Mode (ATM) data transmission protocol, and G984.x, a specification for Gigabit PON (GPON). These standards and recommendations are well-known to persons skilled in the art to which the invention relates.

In accordance with these standards, a PON comprises an optical line terminator (OLT) that is typically located at the central office and a number of optical network terminals (ONTs) (also known as optical network units (ONUs), each located at the subscriber's premises (e.g., home, office building, etc.), with optical fiber and splitters between the OLT and ONTs. In the downstream direction, i.e., data transmitted from the OLT (e.g., located at the exchange) to an ONT (e.g., located at a subscriber's premises), the data units (e.g., ATM data packets) are broadcast from the OLT to all of the ONTs on the PON, and an ONT can select the data to receive by matching the address embedded in the data units to a previously provisioned or learned address. In other words, an ONT only "listens" to data units having a matching address. Thus, the OLT can transmit data to a particular or selected ONT by addressing it to that ONT. In the upstream direction, i.e., data transmitted from an ONT to the OLT, the data units are time-domain multiplexed.

Interest has been expressed in using PONs to distribute compressed digital video (e.g., MPEG-encoded television (TV) content) to subscribers in the manner of a conventional, i.e., copper wire-based, digital cable television system, and in using Internet Protocol (IP) as the transmission protocol so that video delivery can be integrated efficiently with other digital services offered to the subscribers. The most straightforward scheme that has been considered involves broadcasting all available TV channels to all ONTs on the PON in a manner analogous to that in which a conventional cable TV system broadcasts the offered television channels to its subscribers, but it was recognized that bandwidth limitations would prohibit such a solution. To conserve bandwidth, other solutions that are more akin to multicast than broadcast have been proposed. Multicasting refers generally to distributing data to a defined group, and IP multicasting is a term that has been used to refer to distributing data to a group defined by a single IP address. The Internet Group Management Protocol (IGMP) is a well-known standard for IP multicasting.

The proposals for multicasting television channels using IP over PONs have involved creating connections between the OLT and ONTs in response to subscribers' requests to view television channels (e.g., by the subscriber entering a channel on a set-top box using a remote control). In many instances, "provisioning" prior to the time the system is actually used by subscribers is needed to provide an association between each IP TV channel and one of the connections that is to carry that TV channel.

An ONT can have several user ports, each of which can be connected to a compatible set-top box, computer or other device. For example, a subscriber can connect a set-top box and television located in one room of a home to one port and connect another set-top box and television located in another room to another port, so that several family members can watch television simultaneously.

When a subscriber requests to view a TV channel, the ONT at the subscriber's premises will attempt to service the request (locally) by providing the TV channel if at least one other user on the same ONT has been viewing the TV channel or, if no others have been viewing it, will request the TV channel from the OLT. The connections set up between the OLT and ONT to convey that the TV channel is being set up use the ONT Management and Control Interface (OMCI). OMCI is a service-level protocol that specifies the managed entities of a protocol-independent Management Information Base (MIB) that models the exchange of information between the OLT and an ONT. In addition, OMCI covers the ONT management and control channel protocol and the messages that are exchanged between the OLT and ONT for provisioning and setting up services at the ONT. The term "service-level" in this context refers to a high-level protocol, in contrast with the other, lower-level protocols, that the ONT protocol stack comprises. As well understood by persons skilled in the art to which the invention relates, a protocol stack is a group or suite of software elements, each itself defined by a protocol, that interact or communicate with each other in conformance with the networking protocol to which they collectively relate. The lowest-level protocol always relates to physical interaction with the hardware and typically has a very basic interface to the next-highest layer. OMCI, a service-level protocol, is near the top of the ONT protocol stack, while other layers of the ONT protocol stack, such as the Transmission Convergence (TC) layer, are near the bottom of the stack, near the hardware interface.

The OMCI message enables the OLT to set up a connection through which the data is delivered from the OLT to the subscriber's ONT. The ONT, in turn, delivers the data to a set-top box, which decodes the video signal and provides the decoded signal to a television set. The subscriber (user) operates the set-top box in the manner that is common in digital cable television systems, using a remote control to change TV channels, request video-on-demand, and so forth. When a subscriber requests a different TV channel or otherwise requests to drop the channel (e.g., turns off the set-top box), the virtual channel that was set up by the OLT to carry that TV channel to be dropped is deleted using OMCI.

The above-described mechanism for multicasting TV channels using IP over a PON suffers from deficiencies that include long channel setup latency. In other words, the time interval between the subscriber inputting the channel request and the subscriber's ONT beginning to receive the requested television channel is annoyingly long, perhaps on the order of several seconds. The long channel setup latency is due to the use of OMCI messaging between the OLT and ONT. Because OMCI is a service-level, i.e., high-level, protocol, it necessitates communication of several messages and acknowledgements between the OLT and ONT, thereby taking considerable time to set up a virtual channel. It may also involve operator provisioning to associate TV channels and virtual channels prior to operational deployment. It would therefore be desirable to provide a method and system for delivering IP video over a PON network that not only conserves bandwidth but that also does not suffer from excessive channel setup latency. The present invention addresses these problems and deficiencies and others in the manner described below.

SUMMARY OF THE INVENTION

The present invention relates to delivering data representing video content over a passive optical network (PON) using dynamically-assigned virtual channels, i.e., virtual channels that are assigned to television (TV) channels as subscribers request the TV channels and de-assigned from TV channels when subscribers are no longer viewing them. (The term "TV channel" is used in its colloquial sense herein to mean the source of the content and does not refer to a frequency band or similar "channel" in the communications theory sense.) Dynamically assigning and de-assigning virtual channels in this manner conserves bandwidth and improves TV channel setup by multicasting only those TV channels actually being viewed by subscribers rather than broadcasting all available TV channels to all subscribers.

Channel setup, i.e., associating and de-associating TV channels with virtual channels, can be performed with very low latency by using a near-physical layer protocol, such as the Physical Layer Operation Administration and Maintenance (PLOAM) protocol, which is used on the Transmission Convergence (TC) layer of the ONT protocol stack. The TC layer, which is defined by the G984.x and G983.x specifications, is adjacent to the physical medium-dependent layer, which is defined by the G984.2 and G984.1 specifications, both of which are familiar to persons skilled in the art. Nevertheless, as used herein, the term "near-physical layer" means a layer of the protocol stack that is not closer to the highest layer protocol than to the lowest layer protocol.

In accordance with one or more exemplary embodiments of the invention, when a request is received at an optical network terminal (ONT) for video content (e.g., the subscriber changes TV channels), the ONT transmits a first message through the PON to a remote optical line terminator (OLT). The first message can be a conventional IGMP-defined message of the type that identifies or indicates the requested video content (e.g., information associated with the TV channel the subscriber wishes to watch). The first message also identifies the ONT so that the OLT can address its transmissions to that ONT from which the request originated, as there may be many ONTs on the PON.

In response to the first message, the OLT selects an available virtual channel from among a predetermined plurality of virtual channels. For example, the virtual channels can be defined by a 12-bit value, resulting in a potential 4,096 virtual channels. The OLT maintains a table or other data structure to keep track of which virtual channels are in use (i.e., already assigned to a TV channel and thus carrying video content to subscribers' ONTs or other data traffic) and which are available for assignment to TV channels. The OLT then associates the selected virtual channel with an identifier indicating the requested video content.

After the OLT has assigned the requested TV channel to a virtual channel, the OLT transmits a second message through the PON to the requesting ONT that indicates, among other things, the virtual channel on which the requested TV channel can be found. The second message conforms to a near-physical layer protocol such as PLOAM (on the TC layer). With the virtual channel set up and activated in this manner, the OLT begins transmitting the TV channel (or continues transmitting, if the virtual channel was already carrying that TV channel for another subscriber). The ONT receives the TV channel on the specified virtual channel and provides a corresponding signal to the subscriber's set-top box or other device. As in a conventional ONT, an ONT in accordance with embodiments of the present invention has one or more user data ports at which it can output such signals. Digital televisions, set-top boxes, computers, etc., can be connected to these ports.

When the OLT receives a message from an ONT similar to the first message but which indicates the subscriber no longer wishes to view the TV channel (e.g., the subscriber changes TV channels or turns off the set-top box), the OLT ceases to transmit that TV channel on its associated virtual channel for that particular ONT. The OLT then transmits a third message, similar to the second message, indicating that that ONT is no longer to listen to the virtual channel with which that TV channel has been associated.

In an instance in which the ONT from which the request originated is communicating with the OLT in GPON Encapsulation Mode (GEM), the second message (i.e., the PLOAM message) can be called, for example, "Configure Multicast Port-ID," a reference to the use of the term "Port-ID" in the art to identify virtual GEM channels. In an instance in which the ONT from which the request originated is communicating with the OLT in Asynchronous Transfer Mode (ATM), the second message (i.e., the PLOAM message) can be called, for example, "Configure Multicast VP," a reference to the use of the term "Virtual Path" or "VP" in the art to identify virtual ATM channels. Such PLOAM messages can be used to indicate to the ONT both activation and deactivation of virtual channels.

BRIEF DESCRIPTION OF THE DRAWINGS

FIG. 3 illustrates an exemplary PLOAM message format for setting up or tearing down a virtual channel in GEM mode in the embodiment of FIG. 1.

FIG. 4 illustrates another exemplary PLOAM message format for setting up or tearing down a virtual channel in ATM mode in the embodiment of FIG. 1.

FIG. 5 is a table that an Optical Network Terminal (ONT) can maintain to track the associations of physical subscriber or user ports with TV channels in the embodiment of FIG. 1.

FIG. 6 is a table that an Optical Line Terminator (OLT) can maintain to track the associations of TV channels with virtual channels in the embodiment of FIG. 1.

DETAILED DESCRIPTION

Figure 1:
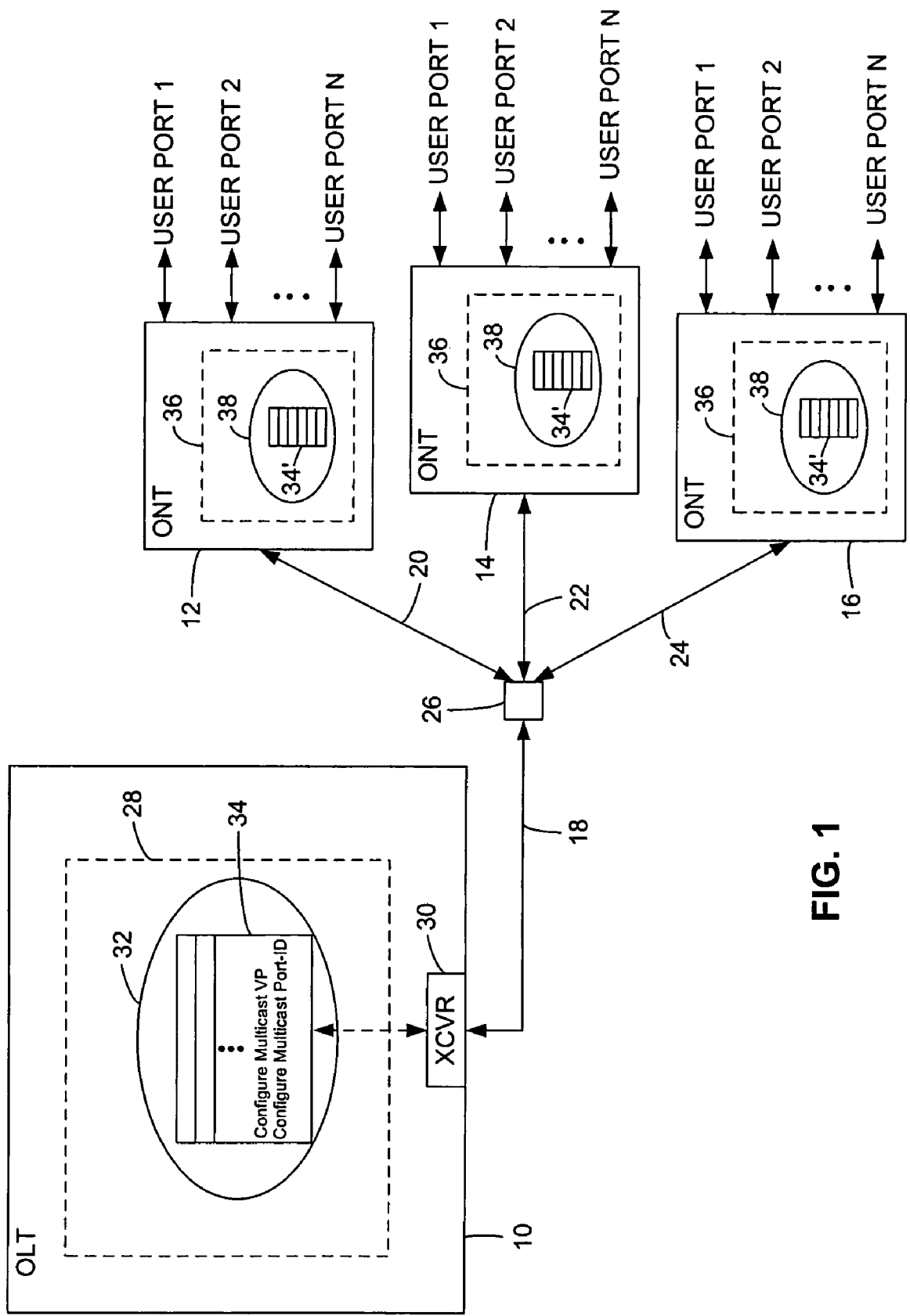
FIG. 1 illustrates a passive optical network in accordance with an exemplary embodiment of the invention.

As illustrated in FIG. 1, in an exemplary embodiment of the invention, a passive optical network (PON) includes an optical line terminator (OLT) 10 and a number of optical network units (ONUs) 12, 14, 16, etc. The OLT 10 is interconnected in the conventional manner with each ONU 12, 14, 16, etc., by optical fibers 18, 20, 22, 24, etc., and one or more optical splitters 26, etc. Although only one such splitter 26 and three such ONUs 12, 14 and 16 are shown for purposes of illustration, the PON can have any other suitable topology and number of ONUs, splitters, fibers, etc. The OLT 10 can be located at, for example, an exchange or central office from which services such as distribution of television (TV) programming and provision of Internet access are operated. The ONUs 12, 14, 16, etc., can be located at, for example, residences or other premises occupied by subscribers to such services. The communication of data on the PON occurs in the manner well-understood in the art, using any of a number of suitable conventional technologies, such as asynchronous transfer mode (ATM) or protocol or GPON Encapsulation Method (GEM), and is therefore not described herein in detail. The present invention relates not to how data is communicated on a PON, but rather to protocols for enabling efficient distribution of TV channels (i.e., TV programming) from the OLT 10 to the ONTs 12, 14, 16, etc., that may request to receive such TV channels.

The OLT 10 is programmed or configured in accordance with the present invention to include OLT control logic 28 that controls the operation of OLT 10, including the OLT portions of the method of operation described below with regard to FIG. 2. OLT control logic 28 can include any suitable (hardware, software, firmware, etc.) element that is conventionally included in such an OLT or known in the art to be useful in such an OLT, including one or more processors, memory, interface logic, etc. The structure and function of such elements are well-known in the art and therefore not described herein in further detail except as it relates to the methods, data structures, etc., in accordance with embodiments of the present invention. In addition to OLT control logic 28, OLT 10 includes other elements such as an optical transmitter and receiver, together represented in FIG. 1 by the transceiver system 30. In general OLT control logic 28 controls the bi-directional communication of data packets or other data units between OLT 10 and ONTs 12, 14, 16, etc.

Transceiver system 30 interfaces via one or more suitable interface elements (not shown for purposes of clarity) with OLT control logic 28. OLT control logic 28 includes the communications control elements (generally in the form or software or firmware) 32 generally of the type that are conventionally included in such an OLT for controlling the bi-directional communication of data packets or other data units between OLT 10 and ONTs 12, 14, 16, etc. Communications control elements 32 includes a protocol stack 34 as well as conventional elements (not shown for purposes of clarity), such as ATM and GEM clients, filters, adapters, frame multiplexers, etc. Protocol stack 34 includes all of the layers conventionally included in a such a protocol stack, including the transmission convergence (TC) layer, which is at a low level, very near the hardware (e.g., transceiver system 30), and higher layers such as the ONT Management and Control Interface (OMCI) layer (not shown for purposes of clarity).

As well-understood in the art, the TC layer defines protocols by which data is framed and delineated for purposes of transmitting and receiving the data through the hardware (e.g., transceiver system 30 and the rest of the PON). Note that in the illustrated embodiment of the invention, the TC layer of protocol stack 34 includes two novel Physical Layer Operation Administration and Maintenance (PLOAM) protocol messages: "Configure Multicast VP," and "Configure Multicast Port-ID." As described below, these new messages are to be included, along with the messages presently defined by the G984.x specifications, in the set of PLOAM protocol messages available for use by higher layers of software.

Each of ONTs 12, 14 and 16 includes ONT control logic 36. ONT control logic 36 controls ONT operation, including the ONT portions of the method of operation described below with regard to FIG. 2. ONT control logic 36 includes elements similar to those of OLT control logic 28 and similarly includes communications control elements 38, including a protocol stack 34'. Protocol stacks 34 and 34' define essentially the same protocols so that OLT 10 can communicate with ONTs 12, 14, 16, etc. Each of ONTs 12, 14, 16 has one or more ATM ports, GEM ports, or ports of both types. Although not shown in FIG. 1 for purposes of clarity, a compatible set-top box, computer or other device can be connected to one of these ONT subscriber or user ports in the conventional manner. For example, a subscriber can connect a set-top box and television located in one room of his home to one port and connect another set-top box and television located in another room to another port, so that two family members can watch television simultaneously. The ONT keeps track of which TV channel is associated with which port in the manner described below.

Figure 2A:
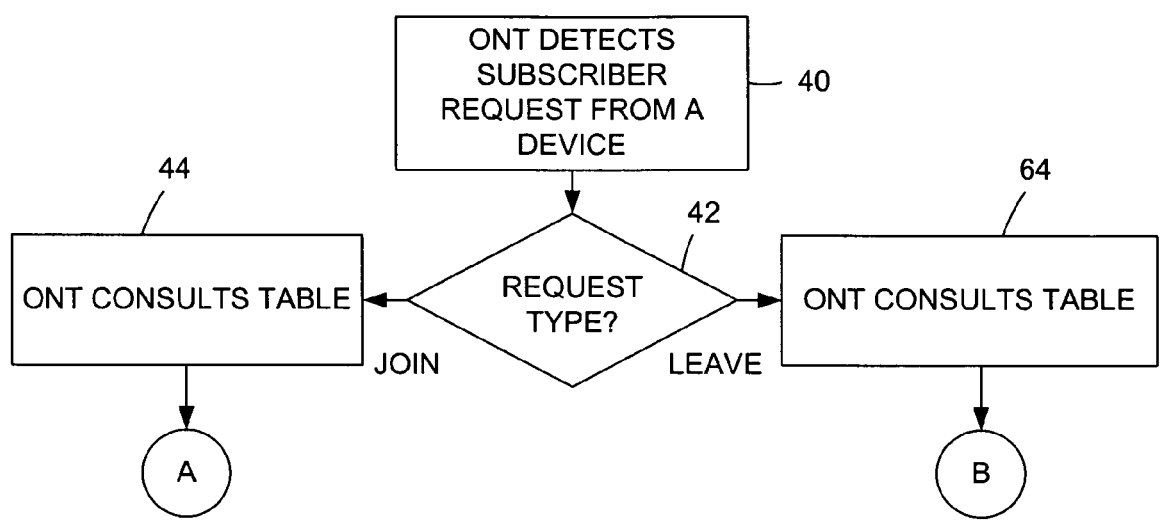
FIG. 2A is a flow diagram illustrating an exemplary method of operation of the embodiment of FIG. 1.
Figure 2B:
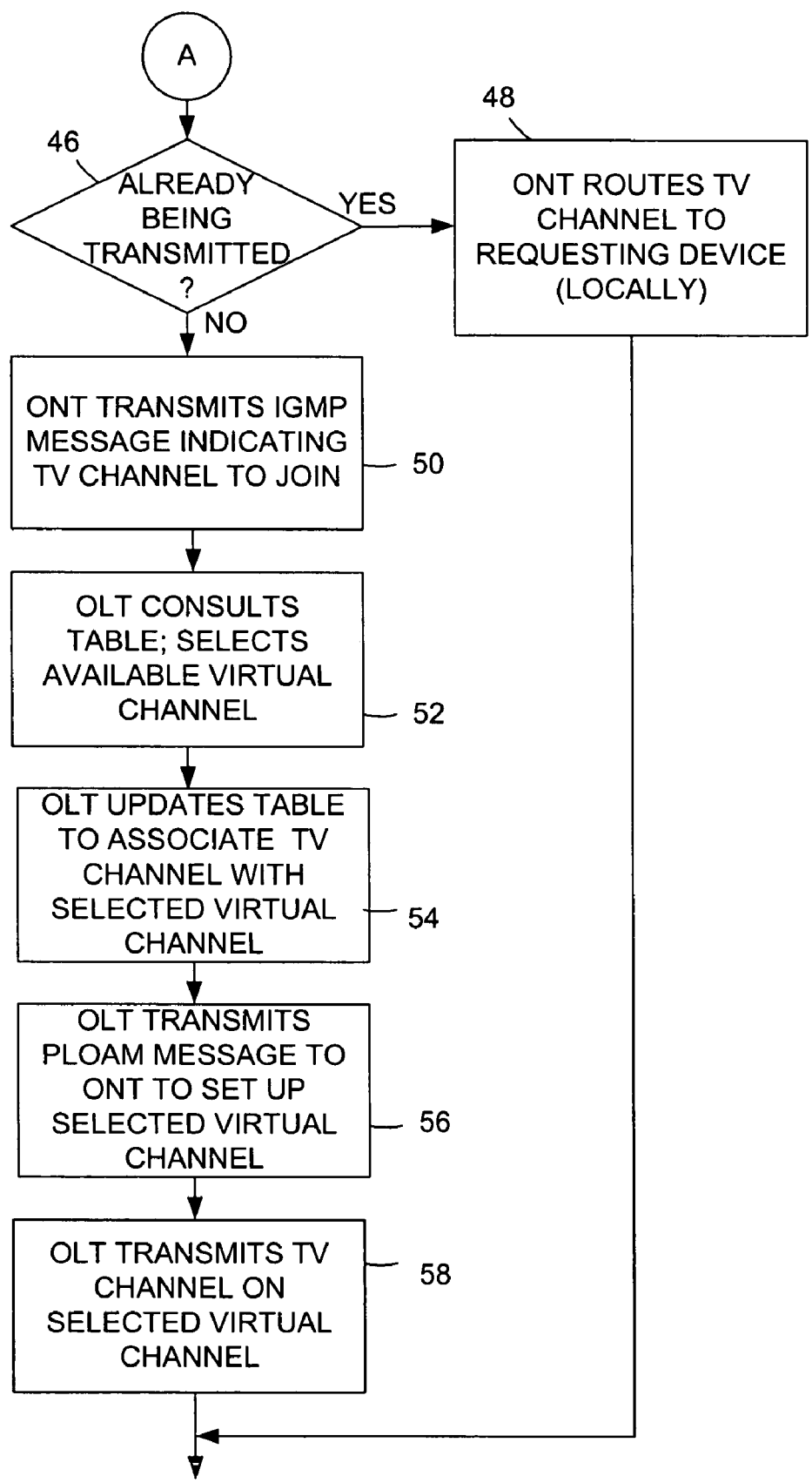
FIG. 2B is a continuation of the flow diagram of FIG. 2A.
Figure 2C:
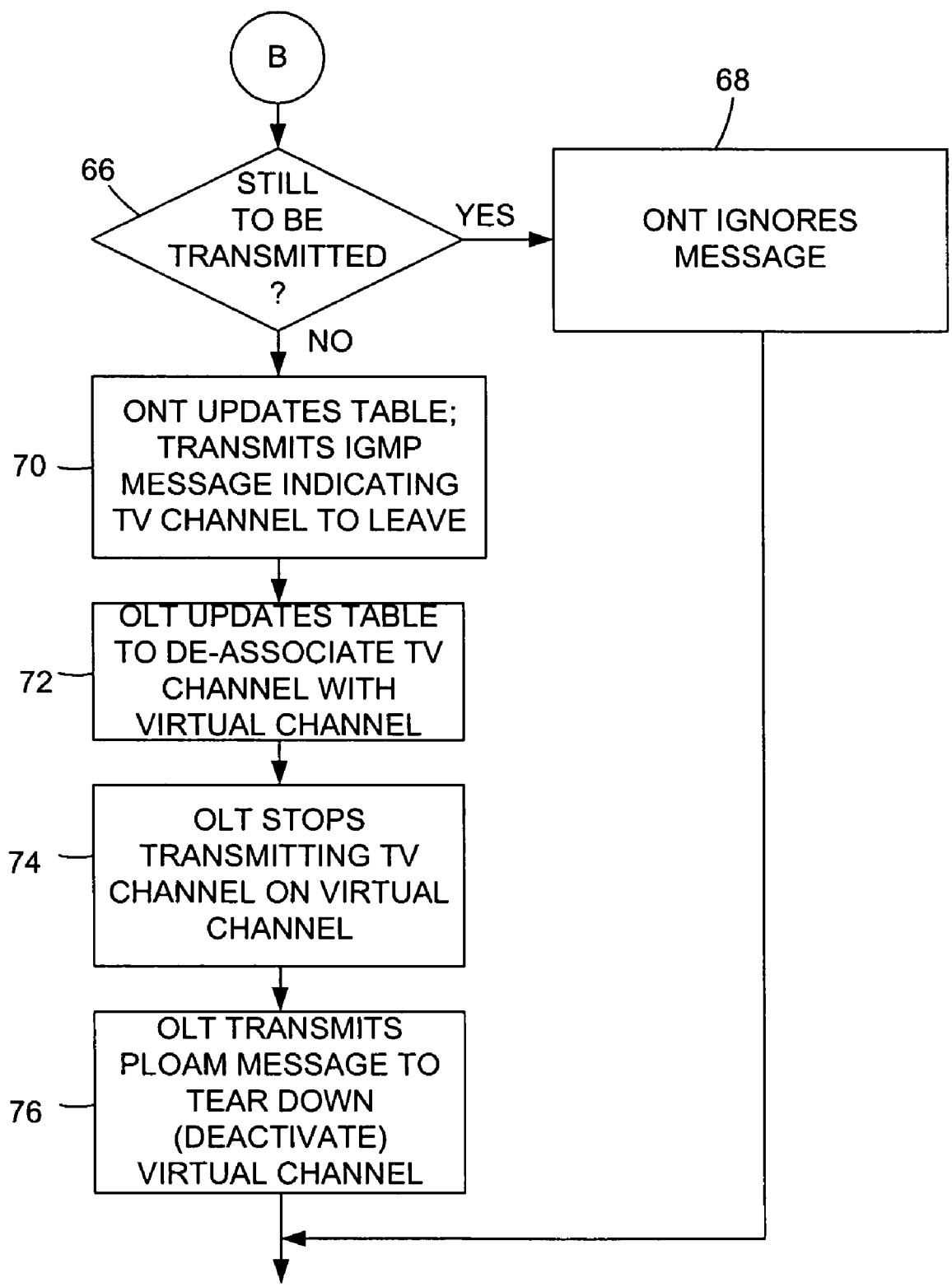
FIG. 2C is a continuation of the flow diagram of FIGS. 2A-B.

An exemplary method of operation is illustrated in FIG. 2. At step 40, one of ONTs 12, 14, 16, etc. detects that a subscriber is using a device to request a TV channel. For example, the user may be changing TV channels using a television set or set-top box (or remote control associated with the television set or set-top box) connected to one of the ONT subscriber ports. The ONT can detect at step 42 whether the request is to add a new channel that the subscriber wishes to view or drop one the subscriber was viewing.

The requests can take the form of Internet Group Management Protocol (IGMP) "Join" and "Leave" messages received from the requesting device via the ONT subscriber ports. As well-understood by persons skilled in the art, a Join message indicates that a host device (e.g., an IP multicast-enabled set-top box) wishes to join an Internet Protocol (IP) multicast group, i.e., a group of one or more hosts defined by a single IP address to which the IP datagrams are transmitted. Conversely, a Leave message indicates that a host device wishes to leave a multicast group.

If the request is to add (or, in the IGMP lexicon, "join") a TV channel (multicast group), then at step 44 the ONT consults a table that can have the format shown in FIG. 5. This table associates the ONT subscriber ports to which the set-top box or other devices are connected with the address of a TV channel.

At step 46 the ONT determines whether the requested TV channel is already available to it, as the ONT may already be providing that TV channel to other subscriber ports (e.g., another person in the same house may already be watching that TV channel on another device). If the ONT is already providing the requested TV channel to another user port, then at step 48 the ONT provides the TV channel locally to the subscriber. If the ONT is not already providing the requested TV channel to another user port, then at step 50 the ONT forwards the request for the TV channel to the OLT 10.

At step 52, the OLT consults the table of FIG. 6 and selects an available virtual channel. At step 54, the OLT associates the selected virtual channel with the requested virtual channel by updating the table of FIG. 6 to associate the address of the requested TV channel with the selected virtual channel.

At step 56, the OLT 10 transmits a Physical Layer Operation Administration and Maintenance (PLOAM) message to the requesting ONT to set up the selected virtual channel. The PLOAM message indicates to the requesting ONT the virtual channel on which the requested TV channel can be found. The PLOAM message, which is referred to herein for purposes of illustration as a "Configure Multicaset Port-ID" message or "Configure Multicast VP" message, depending upon the mode type (GEM or ATM) used by the requesting device can have the formats shown in FIGS. 3 and 4, respectively. As known in the art, a PLOAM message is divided into 13 octets, i.e., groups of eight bits. The first octet can indicate the address of the requesting ONT so that the requesting ONT can determine that the message is intended for it to receive. The second octet can be a message identifier, which as known in the art is a number assigned to each PLOAM message that uniquely identifies the PLOAM message. The last bit of the third octet indicates whether the message represents activation of a virtual channel (i.e., adding or assigning a TV channel) or deactivation of a virtual channel (i.e., dropping or de-assigning a TV channel), and the remaining bits can be filled with zeroes. The fourth octet can indicate the upper eight bits of the selected virtual channel, and the fifth octet can indicate the lower four bits of the selected virtual channel, with the remaining four bits filled with zeroes. One of the octets (e.g., the $13^{th}$) can be used for cyclic redundancy check (CRC) bits. Some of the bits (e.g., the $6^{th}$-$12^{th}$ octets) can be reserved for other uses not relevant to the present invention.

At step 58, the requesting ONT starts receiving the TV channel on the selected virtual channel. The ONT provides the TV channel data to the requesting device (e.g., set-top box) on the user port to which the device is connected.

If the request the ONT detects at step 40 is to drop (or, in the IGMP lexicon, "leave") a TV channel (multicast group), then at step 64 the ONT consults the table of FIG. 5 to determine whether it is still providing that TV channel to other user ports (e.g., another person in the same house may still be watching that TV channel on another device). If at step 66 it is determined that the ONT is still providing that TV channel to another user port, then at step 68 the ONT does not change anything.

If at step 66 it is determined that the ONT is not providing that TV channel to another user port, then at step 70 the ONT updates the table of FIG. 5 and transmits a message to the OLT indicating the TV channel to drop (or leave). At step 72, the OLT receives this message and, in response, updates the table of FIG. 6 at step 74 to stop transmitting the TV channel on the associated virtual channel.

At step 76, the OLT 10 transmits a PLOAM message of the type described above with regard to FIGS. 3-4, i.e., the above-described "Configure Multicast Port-ID" in the case of GEM, or "Configure Multicast VP" in the case of ATM, with the last bit of the third octet set to indicate deactivation (also referred to as "tearing down") of the virtual channel on which the dropped TV channel was being carried.

It will be apparent to those skilled in the art that various modifications and variations can be made to this invention without departing from the spirit or scope of the invention. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for providing the delivery of Internet Protocol (IP) formatted, video content with reduced channel set-up latency over a passive optical network (PON), the method comprising:

receiving one or more messages from an optical network terminator (ONT) at an optical line terminator (OLT), one of the messages comprising a subscriber video content, channel request; and transmitting a Physical Layer Operation Administration and Maintenance (PLOAM) protocol message from the OLT to the ONT through the PON in response to the request, the PLOAM message indicating to the ONT a selected virtual channel containing requested IP formatted video content.

2. The method as in claim 1, wherein the PLOAM message conforms to a Transmission Convergence, near-physical layer protocol and contains information to configure the ONT for multicast port-ID or multicast virtual path operation.

3. The method as in claim 1, wherein the received, request message further comprises an identification of the ONT.

4. The method as in claim 1 wherein the one or more messages further comprise Internet Group Management Protocol JOIN and LEAVE messages.

5. A system for providing the delivery of Internet Protocol (IP) formatted, video content with reduced channel set-up latency over a passive optical network (PON), the system comprising:

an optical line terminator (OLT) for receiving one or more messages from an optical network terminator (ONT), one of the messages comprising a subscriber video content, channel request, and for transmitting a Physical Layer Operation Administration and Maintenance (PLOAM) protocol message to the ONT through the PON in response to the request, the PLOAM message indicating to the ONT a selected virtual channel containing requested IP formatted video content.

6. The system as in claim 5, wherein the PLOAM message conforms to a Transmission Convergence, near-physical layer protocol and contains information to configure the ONT for multicast port-ID or multicast virtual path operation.

7. The system as in claim 5 wherein the request further comprises an identification of the ONT.

8. The method as in claim 5 wherein the one or more messages further comprise Internet Group Management Protocol JOIN and LEAVE messages.

9. The system as in claim 5 further comprising one or more ONTs, wherein at least one of the ONTs transmits the one or more messages to the OLT, including the subscriber video content, channel request.

* * * * *